(12) United States Patent
Sen et al.

(10) Patent No.: US 12,489,792 B2
(45) Date of Patent: Dec. 2, 2025

(54) SERVICE RISK DISCOVERY BASED ON RISK OBJECTS

(71) Applicant: Microsoft Technology Licensing, LLC, Redmond, WA (US)

(72) Inventors: Bhaskar Sen, Redmond, WA (US); Jean-Simon Marrocco, Laval (CA); Nikhil Gopal, Redmond, WA (US); Neil Thistlethwaite, Redmond, WA (US); Erik Robert Swanson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 235 days.

(21) Appl. No.: 18/146,696

(22) Filed: Dec. 27, 2022

(65) Prior Publication Data
US 2024/0214426 A1    Jun. 27, 2024

(51) Int. Cl.
*H04L 29/00*    (2006.01)
*H04L 9/40*    (2022.01)

(52) U.S. Cl.
CPC .................................. *H04L 63/20* (2013.01)

(58) Field of Classification Search
CPC ...................................................... H04L 63/20
USPC .............................................................. 726/1
See application file for complete search history.

(56) References Cited

U.S. PATENT DOCUMENTS

| 2022/0083933 | A1* | 3/2022 | Nag | ..................... G06F 18/2433 |
| 2022/0239564 | A1 | 7/2022 | Jiang | |

FOREIGN PATENT DOCUMENTS

CN        115017303 A        9/2022

OTHER PUBLICATIONS

Chen Jindong et al: "The distributed representation for societal risk classification toward BBS posts", Journal of Systems Science and Complexity, Academy of Mathematics and Systems Science, Chinese Academy of Sciences, Beijing, vol. 30, Issue. 3, Dec. 29, 2016, pp. 627-644.
International Search Report and Written Opinion received for PCT Application No. PCT/US2023/081715, Mar. 7, 2024, 14 pages.
Kuppa, et al., "Linking CVEs to Mitre Att&Ck Techniques", The 2021 12th International Conference On E-Business, Management and Economics, Acmpub27, New York, Ny, Usa, Aug. 17, 2021, pp. 1-12.
International Preliminary Report on Patentability received for PCT Application No. PCT/US2023/081715, mailed on Jul. 10, 2025, 07 pages.

* cited by examiner

*Primary Examiner* — Jeffrey C Pwu
*Assistant Examiner* — Michael D Anderson
(74) *Attorney, Agent, or Firm* — Holzer Patel Drennan

(57) ABSTRACT

The described technology provides a service risk discovery system for recommending, for a cloud based service sharing the service group hierarchy, a predetermined number of top risk observations based on the ranking of the one or more of the risk observations. The system generates the ranking by joining a plurality of risk objects of one or more of the group of cloud based services based on a service identification field of the plurality of risk objects to generate a service group risk vector, the service group risk vector including a plurality of risk observations for the group of cloud based services.

20 Claims, 8 Drawing Sheets

SERVICE RISK DISCOVERY BASED ON RISK OBJECTS

BACKGROUND

Software and data management system often undertake risk threat modeling (RTM) to identify risks and threats such as what are the potential sources of attacks on data, how can an attacker change the authentication data, what is the impact if an attacker can read the user profile data, what happens if access is denied to the user profile database, etc. RTM allows software architects to identify and mitigate potential security, reliability, and resiliency issues early when they are relatively easy and cost-effective to resolve. As a result, it greatly reduces the total cost of development. Also, RTM makes threat modeling easier for all developers by providing clear guidance on creating and analyzing threat models.

SUMMARY

The described technology provides a service risk discovery system for recommending, for a cloud based service sharing the service group hierarchy, a predetermined number of top risk observations based on the ranking of the one or more of the risk observations. The system generates the ranking by joining a plurality of risk objects of one or more of the group of cloud based services based on a service identification field of the plurality of risk objects to generate a service group risk vector, the service group risk vector including a plurality of risk observations for the group of cloud based services, combining, for one or more of the plurality of risk observations, a plurality of data fields of the risk observations to generate a risk observation text field for the one or more of the plurality of risk observations, generating a vector representation of the risk observation text field for the one or more of the plurality of risk observations, and calculating pairwise similarity between the one or more of the plurality of risk observations based on the vector representations of the risk observation text fields of the one or more of the plurality of risk observations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Providers of cloud based services do a large amount of risk threat modeling (RTM) before and after execution of services. Such RTM requires a lot of time and knowledge on part of the service providers. The technology disclosed herein provides risk discovery for new, or even existing cloud based services, based on risk objects such as risk tickets for existing services. Specifically the service risk discovery system disclosed herein finds existing risks, generates training data using the information about the existing risks, and trains machine learning or artificial intelligence models using the training data.

Implementations of the described technology provides a service risk discovery system for recommending, for a cloud based service sharing the service group hierarchy, a predetermined number of top risk observations based on the ranking of the one or more of the risk observations. The system generates the ranking by joining a plurality of risk objects of one or more of the group of cloud based services based on a service identification field of the plurality of risk objects to generate a service group risk vector, the service group risk vector including a plurality of risk observations for the group of cloud based services, combining, for one or more of the plurality of risk observations, a plurality of data fields of the risk observations to generate a risk observation text field for the one or more of the plurality of risk observations, generating a vector representation of the risk observation text field for the one or more of the plurality of risk observations, and calculating pairwise similarity between the one or more of the plurality of risk observations based on the vector representations of the risk observation text fields of the one or more of the plurality of risk observations.

The implementations of the service risk discovery system disclosed herein assists in generating RTM more quickly and efficiently. Furthermore, the recommendations generated by the system increases the coverage provided by the RTM and reduces the risk of duplication of efforts at the system level.

Figure 1:
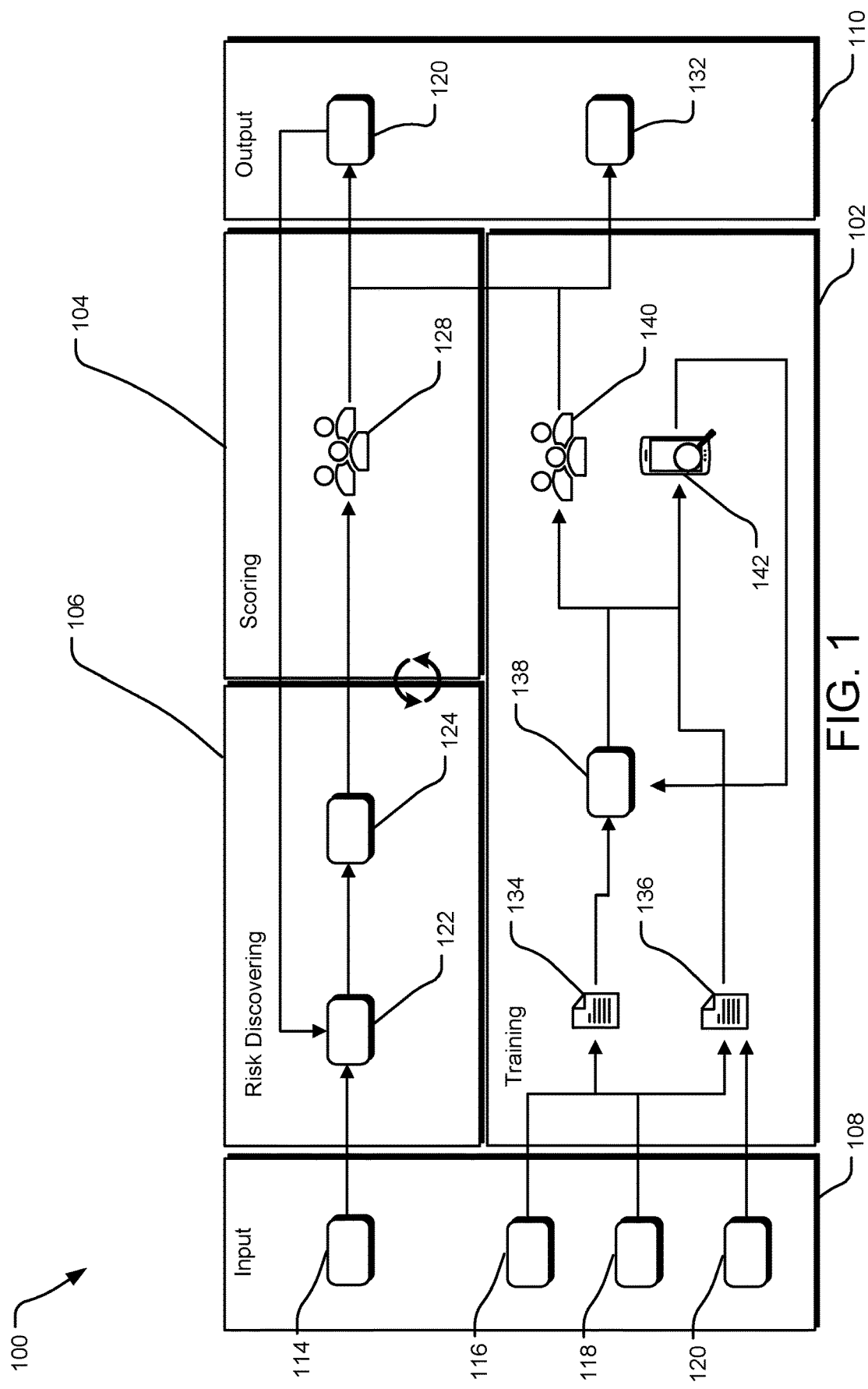
FIG. 1 illustrates an example implementation of a service risk discovery system disclosed herein.

FIG. 1 illustrates an implementation of a service risk discovery system 100 disclosed herein. The service risk discovery system 100 employs training engine 102 to train and validate a recommendation model for recommending risk levels associated with a service, a scoring engine 104 scores the recommended risk levels based on their closeness to original or observed risk levels. The service risk discovery system 100 also includes a risk discovery feedback engine 106 that receives feedback from output 110 to update the recommended risk levels based on feedback. An input module 108 generates various inputs that can be used by the various component engines of the service risk discovery system 100. The service risk discovery system 100 generates output 110, including risk recommendations 132 and feedbacks 130 for the risk recommendations 132.

In one implementation, the inputs 108 may include live data stream 114 of service identifications, risk objects 116, a service tree 118 providing hierarchy of cloud based services, and a risk discovery recommendation (RDR) feedback data 118. The risk objects 116 may be, for example, risk tickets for ActiveX data objects (ADOs). The live data stream 114 of service identifications may include live stream of component service objects accessing cloud based online data sources along with the identifications of the component service objects. The service tree 118 may include a list of cloud based services with each field providing s service identification, a name of the service, a description of the service, and group identification identifying a service group that the service belongs to. For example, a service group may be services that are related to data access. Another service group may be services that are related to data aggregation. The RDR feedback data 120 is the feedback that is generated by the scoring engine 104.

The training engine 102 may take the risk objects 116 and the service tree 118 and generate training data 134 for a service risk recommendation generation model 138. For example, the service risk recommendation generation model 138 may be a machine learning model that associates risk recommendations to groups of services identified in the service tree based on the observed risk as determined from the risk objects 116. The training data 134 may be generated by joining the risk objects related various groups of cloud based services based on a service identification field of the plurality of risk objects to generate a service group risk vector. For example, the service group vector may include a number of risk observations for the group of cloud based services.

Additionally, the training data 134 may also be generated by combining data fields of the risk observations to generate risk observation text fields and generating vector representations of the risk observation text field for the various risk observations. Additionally, the training data 134 may also include pairwise similarity between the risk observations based on the vector representations of the risk observation text fields of the risk observations. Generating the vector representation of the risk observation text field may include employing a Doc2Vec which embedds words from the risk observations into lower dimensional vector space of numeric numbers.

In one implementation, a training algorithm may be used to generate the training data 134. Such training algorithm may receive the risk tickets 116 and a knowledge graph indicating service and service groups as per the service tree 118 and generate a map of significant risks per cluster of services as part of the training data 134. An example implementation of the training algorithm may include operations of generating a vector D based on the list of risk tickets R using a vectorizer, such as for example a Doc2Vec vectorizer, and identifying services S in each service group G, and determining the embedded risks E in each service group G.

Subsequently, for each embedded risk e in E and for a predetermined, or top n, number of risks, the training algorithm compares a risk with the risks of other services (excluding the risks of its own service). The selected top n risks are linked with the other most similar risks. For example, a risk of phishing may be linked to a risk of service breakdown, etc. Subsequently, the training algorithm determines that the risk with high number of connections is a risk that may fit with a new incoming service.

The training engine 102 may also generate validation data 136 based on the service tree 118 and the RDR feedback 120. In one implementation, a validation algorithm 142 may be used to generate the validation data 136. The validation algorithm 142 determines how close are the recommended risks per group of services to the original risks for these services. The validation algorithm may take a list of validation service values Val_S, a list of risks R, and map T of significant risk per service group as input and generates validation score $Val_{score}$ as mean square error (MSE) of maximum cosine similarity score between the recommended risks and the original risks.

Specifically, for each validation service vs in Val_S, the validation algorithm 142 first determines a group of risks R(vs) as original ground truth, where vs is not part of the training. Subsequently, for a recommended risk r in T, the validation algorithm 142 adds a maximum cosine between r, and R(vs) in a maxSim vector. The mean of the maxSim is added to the scores vector. Subsequently, it generates the validation score $Val_{score}$ as mean square error (MSE) of maximum cosine similarity score between the recommended risks and the original risks.

The training engine 102 may submit the training data 134 and the output of the validation algorithm 142 to a testing algorithm 140 for a number of risks and services. For example, the testing algorithm 142 may test the training data by selecting one service per cluster or group of services that had the average number of risks. The output of the testing algorithm 142 can be subsequently used as risk discovery recommendations (RDR) for various cloud based services.

The risk discovery feedback engine 106 uses the live data stream 114 and the RDR feedback data 120 to generate risk discovery recommendations that are stored in a risk discovery recommendations cache 124. The risk discovery recommendations from the cache 124 may be provided to user 128 based on periodic updates, such as for example, twice a day. Any feedback received from the users 128 may be output as RDR feedback 120 and fed back to the risk discovery feedback engine 106.

Figure 2:
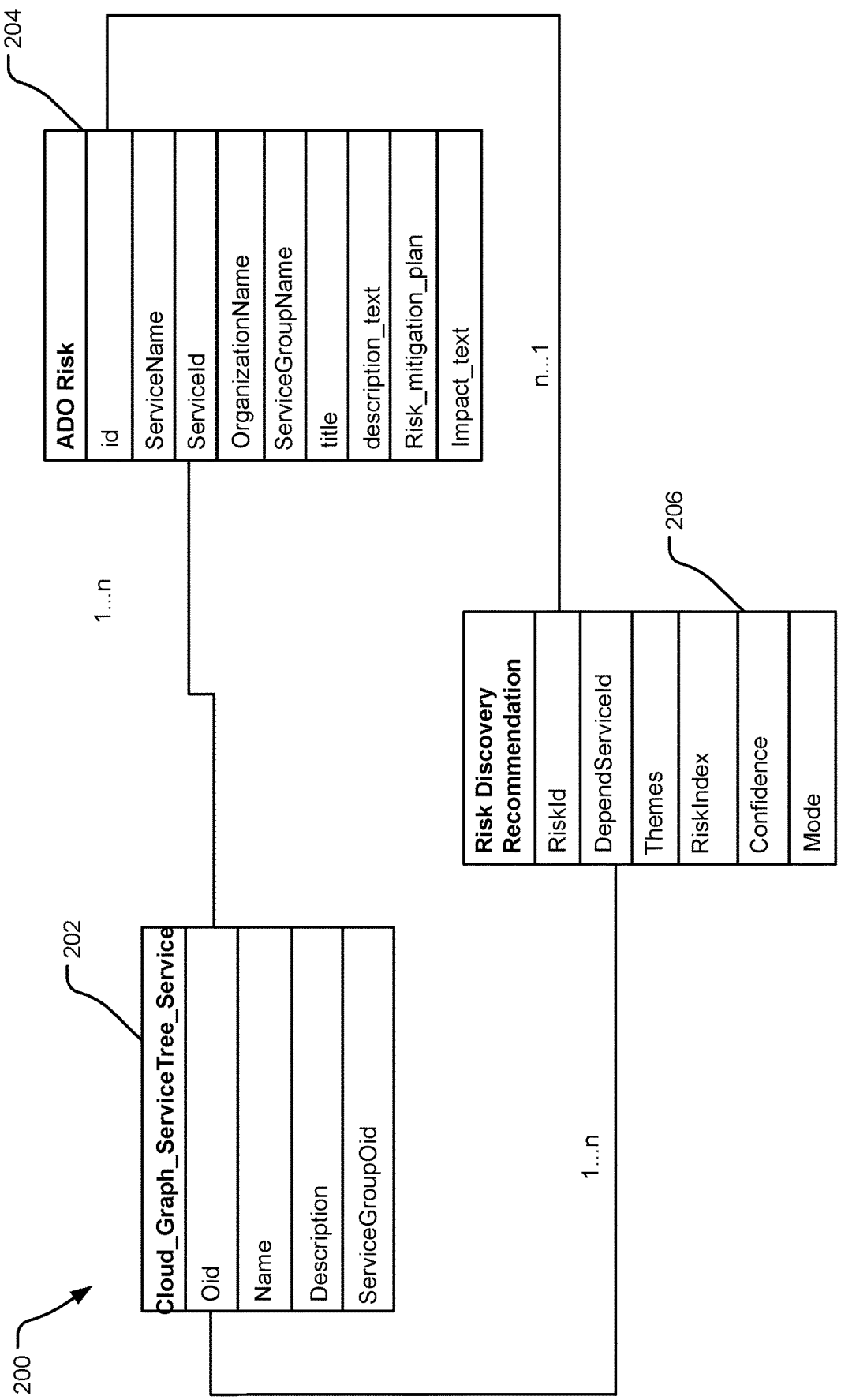
FIG. 2 illustrates an example join operation for joining data from service tree for cloud based services and the risk threat model (RTM) risk data together into a knowledge graph.

Now referring to FIG. 2, it illustrates a join operation 200 for joining data from service tree for cloud based services and the risk threat model (RTM) risk data together into a knowledge graph. Specifically, the join operation 200 joins service tree records 202 with ADO_Risk object records 204 to generate risk discovery recommendation (RDR) records 206. The service tree records 202 may include fields of object ID (OID), name of the service, service group object ID, and description of the service. Here the service group ID may be used to identify the group of service that the particular service belongs to or can be classified in. For example, the service group ID field may identify a collection service and a fields collection service as database service group.

The ADO_Risk object records 204 may include various fields including object ID, title of risk ticket, organization name, service group name, service name, service ID, description text, impact text, risk mitigation plan, other tags, and themes. One or more of these fields are string type fields with data in text form that contains information identifying the risk type, risk impact, etc. The joining operation may join the service tree records 202 and the ADO_Risk object records 204 using an object ID (OID) field from the service tree records 202 and a service ID field from the ADO_Risk object records 204 as the keys.

As illustrated in FIG. 2, the relation between the object ID (OID) field in the service tree records 202 and a service ID field in the ADO_Risk object records 204 may be a 1:n relation in that for each service there may be a number of risk object records 204. As a result, for the resulting risk discovery recommendation (RDR) records 206 table, there may be n risk RDR records 206 for each service from the service tree. For example, for a Recordset service object, there may be number of RDR records. The risk discovery recommendation system disclosed herein further processes the text data from the RDR records 206 to generate a vector representation of the risk observation text field for the one or more of the plurality of risk observations.

Figure 3:
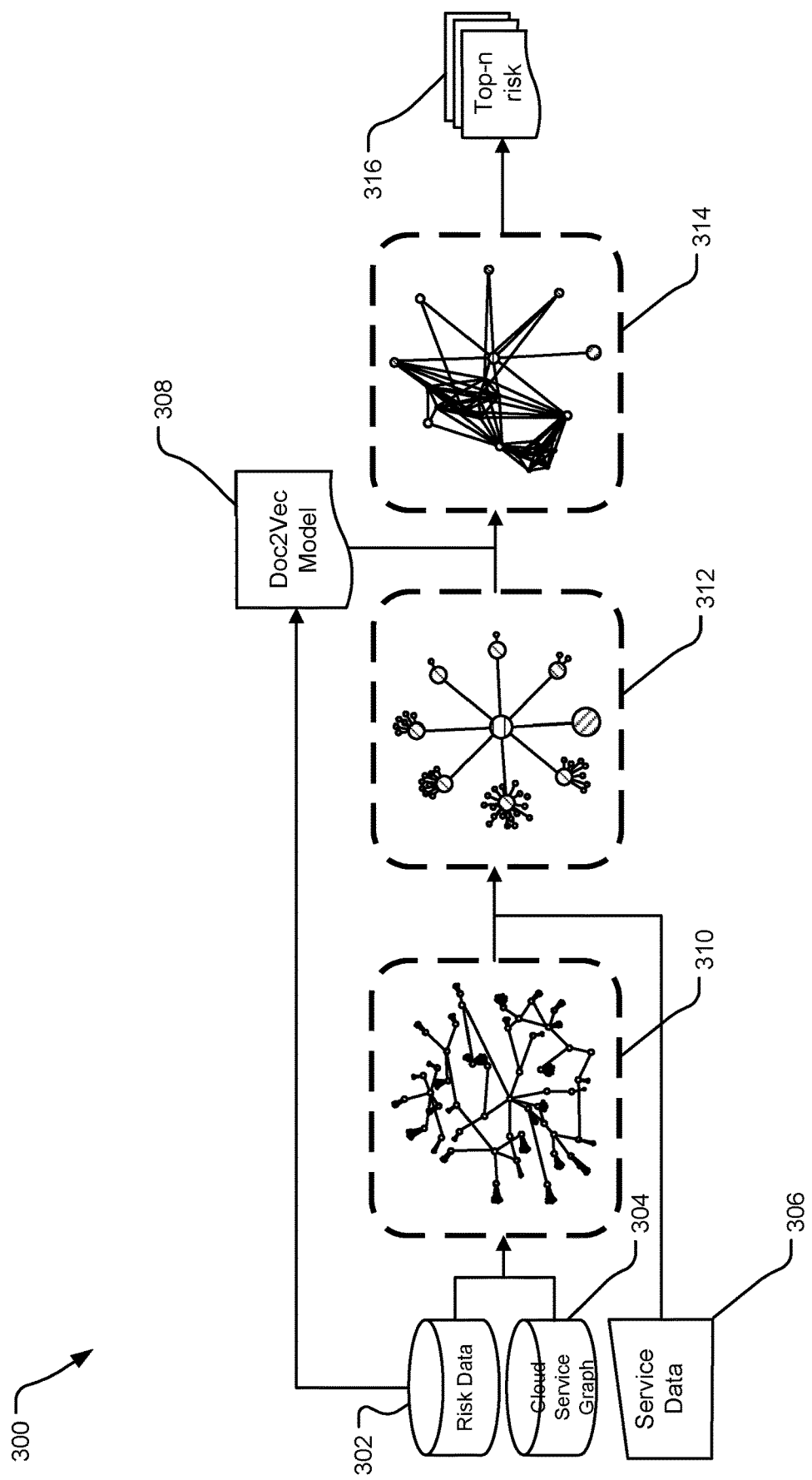
FIG. 3 illustrates alternative example model of data flow for the risk discovery system disclosed herein.

FIG. 3 illustrates a model 300 of data flow for the risk discovery system disclosed herein. The risk data 302 may be a database storing a number of risk ticket records based on risk incidents as well as identified risk threats over a predetermined time period. The cloud service graph 304 may include various cloud service records that identifies various cloud based services including the group or hierarchy that the cloud service belongs to. The records from the risk data 302 and the cloud service graph 304 are combined with a join operation to generate clustering 310 of risk data by service, service group, and organizations. Thus, the clustering 310 (as disclosed in further detail below in FIG. 4) illustrates clusters of risk incidents and threats per service, per service group, and per organization.

While the clustering 310 is a graphical representation, the underlying clustered data may be in the form of a table with each record in the table including risk data, service name, service group, organization group, and other fields. The clustered risk data as illustrated by the clustering 310 is combined with service data 306 to generate filtered risk data 312. The filtered risk data 312 may be generated by filtering for any duplicate risks identified in the joined risk observation data. In one implementation, the filtered risk data 312 is generated by selecting a predetermined number of top n risk observations from the joined risk observation data and applying a term frequency-inverse document frequency (TF-IDF) transformation on the top n risk observations. The TF-IDF transformation also removes risk observation errors due to spelling mistakes and removes any template text that creates the noise in the joined risk observation data. Furthermore, the TF-IDF transformation also removes the duplicate risk observations from the joined risk observation data.

The risk discovery system also applies a document to vector (doc2vec) model 308 to the risk data 302 to generate numeric representations of the risk ticket documents in the risk data. Specifically, the doc2vec model 308 is trained on the risk data 302 to get vector representation of the risks. Subsequently, for each service cluster as identified in the filtered risk data 312 the risk discovery system calculates pairwise or cosine similarity with the other risks for the same service cluster. Here a service cluster includes cloud-based services that share same group or hierarchy. Such pairwise similarities between various risks are illustrated graphically by a relation graph 314 (also discussed in further detail below in FIG. 6). Finally, based on the pairwise similarities between various risks, the risk discovery system outputs risk recommendations 316 for the top n risks.

Figure 4:
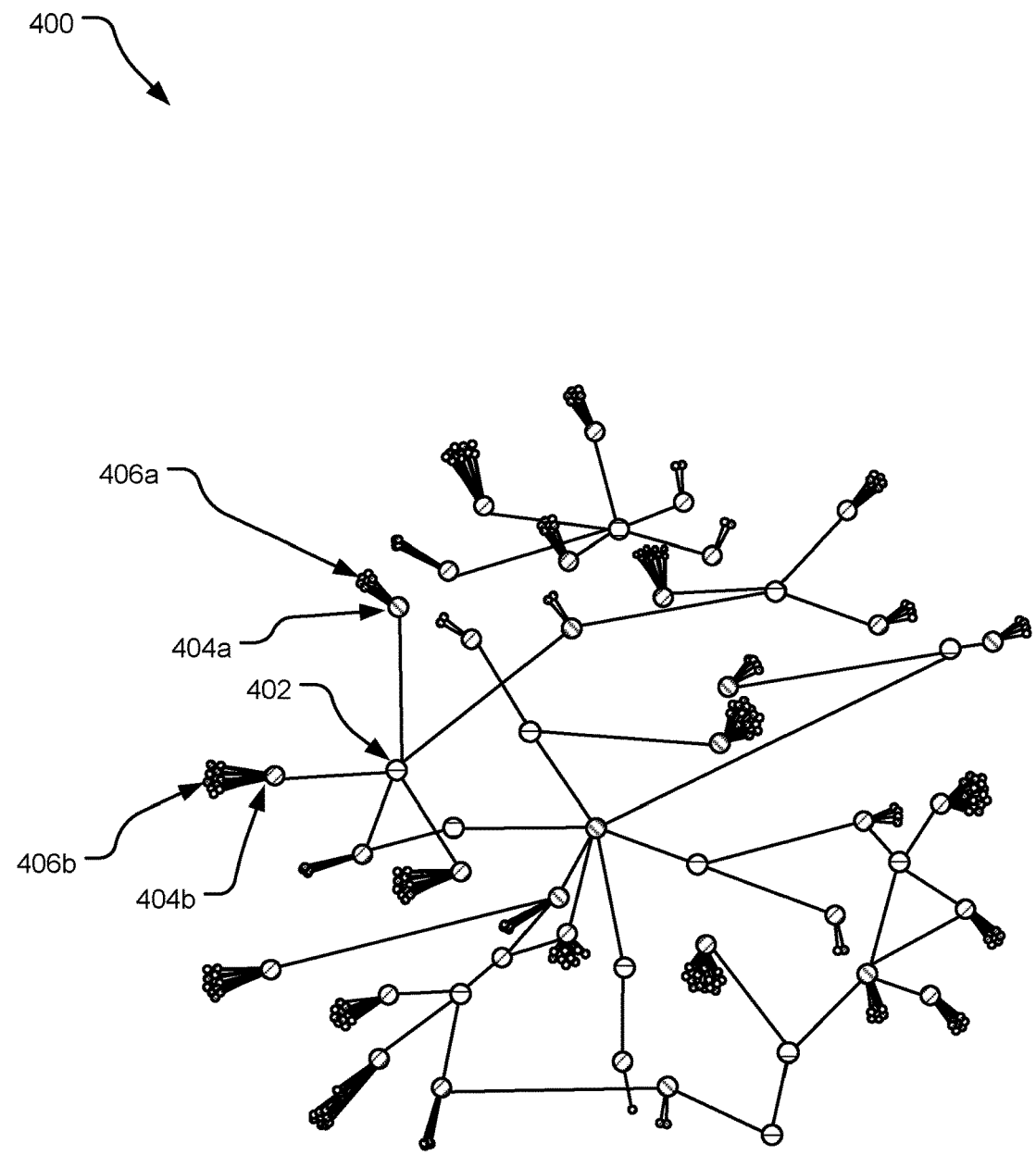
FIG. 4 illustrates example granularity of risk data clustered by service, service group, and organization.

FIG. 4 illustrates a graph 400 showing granularity of risk data clustered by service and service group for an organization. For example, for a service group 402, which may be a messaging service group with a number of related message services, including an instant messaging service 404a and a multimedia messaging service 404b. Here the instant messaging service 404a may have a cluster 406a of risks related thereto, whereas the multimedia messaging service 404b may have a cluster 406b of risks attached thereto.

Figure 5:
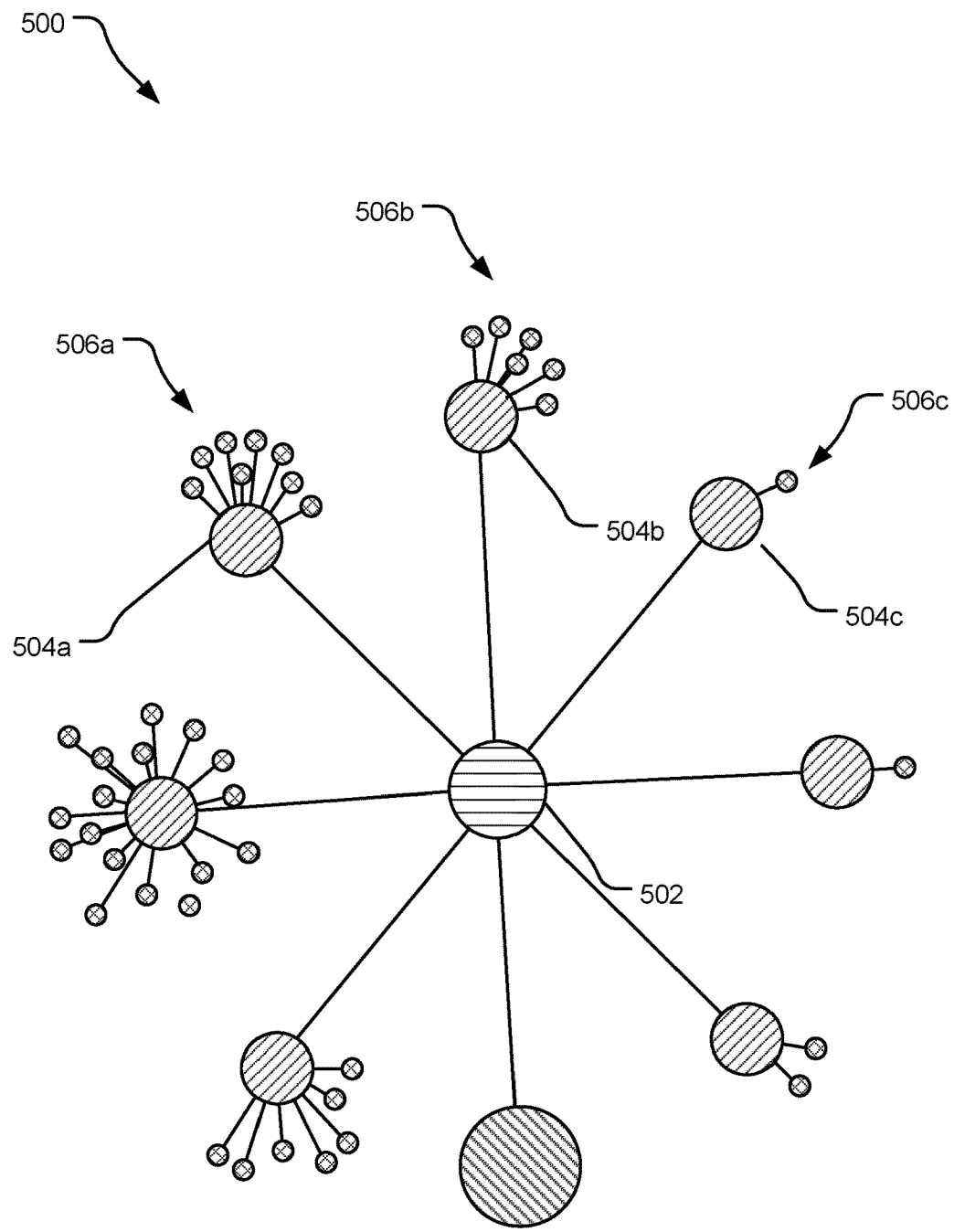
FIG. 5 illustrates example of filtering in of risk data coming in from similar group of service.

FIG. 5 illustrates a graph 500 showing filtering in of risk data coming in from similar group of service. For example, the graph 500 illustrates filtered risk data for services related to database platform 502, with an SQL availability services 504a, an SQL deployment infrastructure services 504b, an SQL backup restore service 504c, etc. The graph 500 also illustrates a number of filtered risks 560 for each of the services 504.

Figure 6:
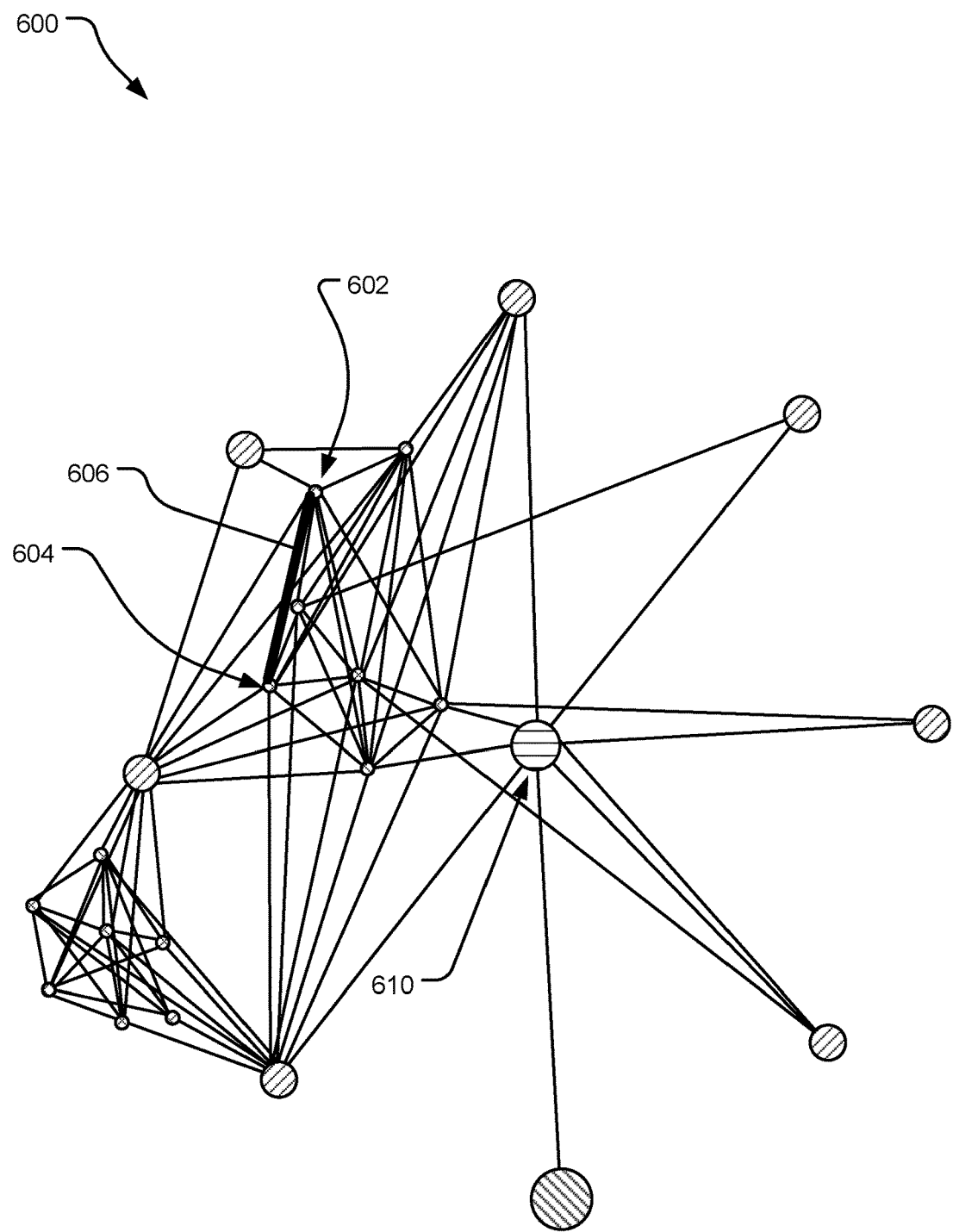
FIG. 6 illustrates example graph of relationships between risks using natural language processing (NLP).

FIG. 6 illustrates a graph 600 of relationships between risks determined using natural language processing (NLP). For example, the cosine difference 606 between a phishing attack risk 602 and a data corruption risk 604, each related to a service group of messaging services 610, may provide the pairwise similarity between these two risks. Once all the pairwise similarity score are calculated for all the risks related to services for the service group 610, for each given risk the risk discovery system ranks other risks with the biggest pairwise similarity score with the given risk. In one implementation, a predetermined number (for example 10) of risks with highest pairwise similarity with the given risks are selected.

Subsequently, for the cluster of risks for the messaging services 610, the risk discovery system ranks each risk 602, 604, etc., on how many times they appear in the selected top 10 lists for the other risks to give the risks in the cluster a ranking of how likely that risk is a general risk to that cluster. Thus, for example, if the phishing attack risk 602 appears 15 times in the top 10 lists of other risks and the data corruption risk 604 appears 11 times in the top 10 lists of other risks for the service group of messaging services 610, the risk discovery system determines that the phishing attack risk 602 is more likely to be a general risk for the service group of messaging services 610.

Subsequently, the risk discovery system selects top n risks for any service group. Because the risk discovery system uses the TF-IDF model to filter duplicate risks, the recommended risk is likely to not have any duplication or a false recommendation due to spelling error, etc.

Figure 7:
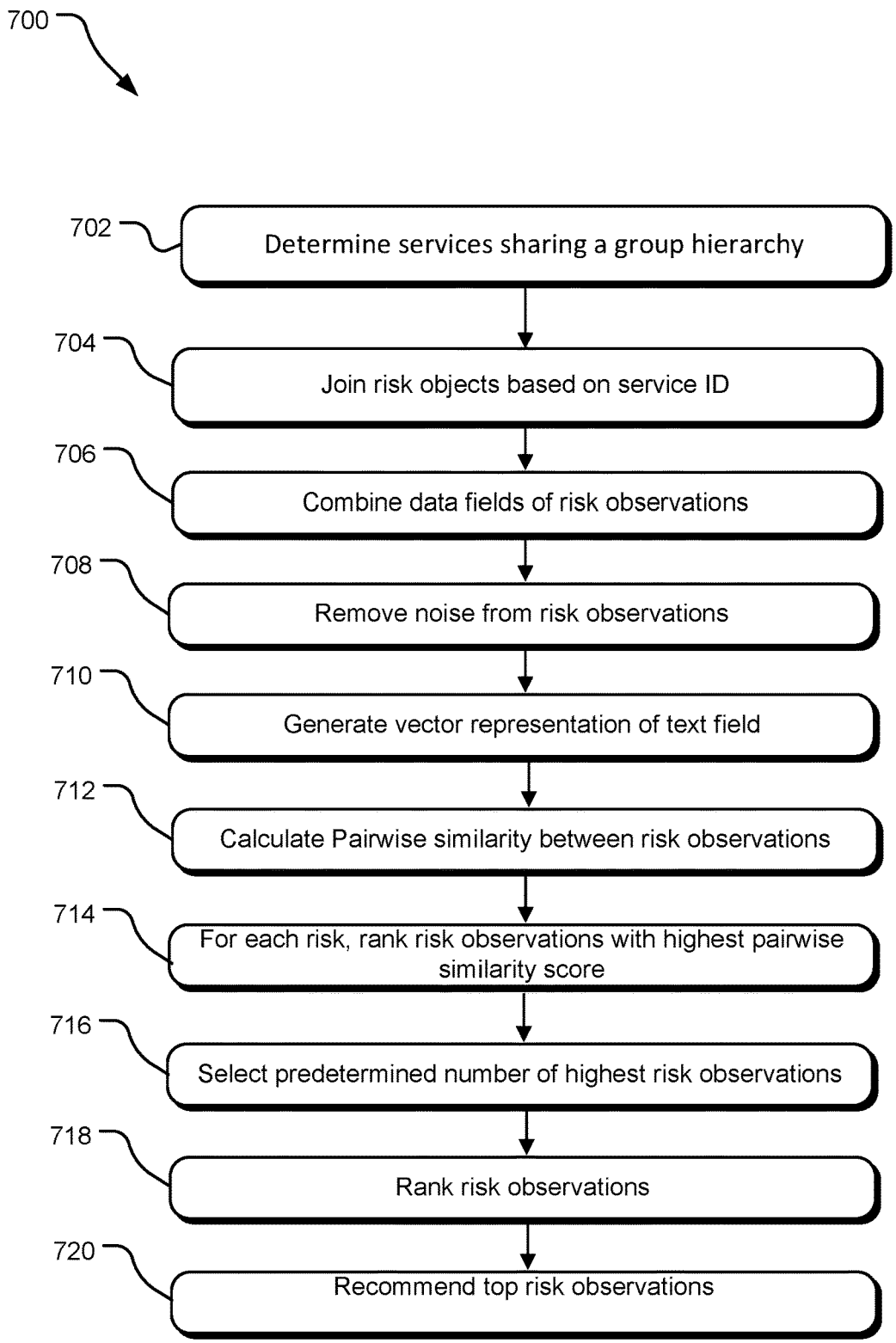
FIG. 7 illustrates example operations of the system disclosed herein for discovering service risk based on risk objects.

FIG. 7 illustrates operations 700 of the system disclosed herein for discovering service risk based on risk objects. An operation 702 determines a list of services sharing a group hierarchy. For example, various cloud-based services with their group hierarchy may be provided in a graph service tree where each service record is identified by its group. An operation 704 joins a number of risk objects, such as risk tickets, related to the group of cloud based services based on a service identification field of the risk objects. As a result of the join operation, the operation 704 may generate a service group risk vector in the form of a table. For example, the service group risk vector generated by operation 704 may include a number of risk observations, such as in the form of risk tickets, for the group of cloud-based services.

For each of the risk observations for the group of cloud-based services, a combining operation 706 combines the fields from the risk observations to generate a risk observation text field for the risk observations. For example, the combining operation 706 combines the fields of themes, risk index, confidence, mode, etc., to generate a text form of risk observation text field for each observation. An operation 708 removes noise from the various risk observation text fields. In one implementation, removing the noise from the risk observation text fields may include performing a TF-IDF transformation on the text of the risk observation text fields.

Subsequently, an operation 710 generates a vector representation of the risk observation text field for the risk observations. For example, generating the vector representation may involve performing a document to vector (Doc2Vec) transformation on the transformed risk observation text fields. For example, a Doc2Vec transformation model may iterate over a corpus of data in the risk observation text field over a number of times to generate an output vector in form of a string of numbers. An operation 712 determines pairwise similarity between the various risk observations based on the vector representations of the risk observation text fields. For example, generating such pairwise similarity may include calculating the cosine distance between the vector representation of each of the risk observation.

For each given risk for a given service group, an operation 714 ranks other risk observations with biggest pairwise similarity score with the given risk. Subsequently, an operation 716 selects a predetermined number (for example 10) of risks with highest pairwise similarity with the given risks. An operation 718 ranks each risk observation for a given service group based on how many times the risk observations appear in the selected top 10 lists for the other risk observations to give the risk observations in the service group a ranking of how likely that risk is a general risk to that service group. An operation 720 recommends a predetermined number of top risk observations as likely risks for the service group.

Figure 8:
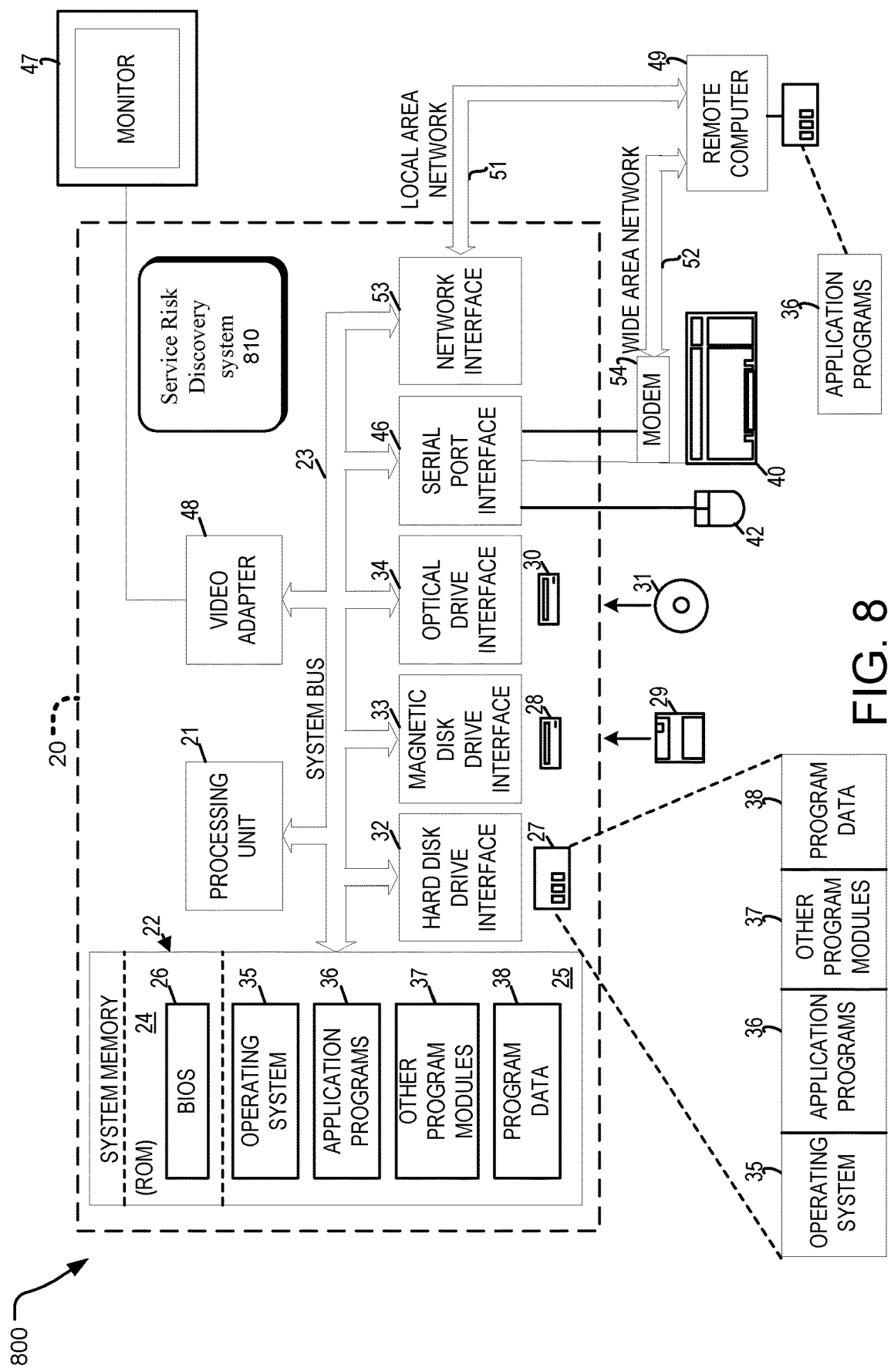
FIG. 8 illustrates an example system that may be useful in implementing the high latency query optimization system disclosed herein.

FIG. 8 illustrates an example system 800 that may be useful in implementing the high latency query optimization system disclosed herein. The example hardware and operating environment of FIG. 8 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 8, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a high latency query optimization system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIG. 8. Similarly, instructions stored on the memory of the computer 20 may also be used to implement one or more operations of FIG. 1. The memory of the computer 20 may also one or more instructions to implement the high latency query optimization system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the service risk discovery system 810 may be stored in system memory 22 and/or storage devices 29 or 31 and processed by the processing unit 21. high latency query optimization system operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of high latency query optimization system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The high latency query optimization system disclosed herein may include a variety of tangible computer-readable storage media and intangible computer-readable communication signals. Tangible computer-readable storage can be embodied by any available media that can be accessed by the high latency query optimization system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the high latency query optimization system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

An implementation disclosed a method including determining a group of cloud based services sharing a service group hierarchy, joining a plurality of risk objects of one or more of the group of cloud based services based on a service identification field of the plurality of risk objects to generate a service group risk vector, the service group risk vector including a plurality of risk observations for the group of cloud based services, combining, for one or more of the plurality of risk observations, a plurality of data fields of the risk observations to generate a risk observation text field for the one or more of the plurality of risk observations, generating a vector representation of the risk observation text field for the one or more of the plurality of risk observations, and calculating pairwise similarity between the one or more of the plurality of risk observations based on the vector representations of the risk observation text fields of the one or more of the plurality of risk observations.

An alternative implementation discloses one or more physically manufactured computer-readable storage media, encoding computer-executable instructions for executing on a computer system a computer process, the computer process including determining a group of cloud based services sharing a service group hierarchy, joining a plurality of risk objects of one or more of the group of cloud based services based on a service identification field of the plurality of risk objects to generate a service group risk vector, the service group risk vector including a plurality of risk observations for the group of cloud based services, combining, for one or more of the plurality of risk observations, a plurality of data fields of the risk observations to generate a risk observation text field for the one or more of the plurality of risk observations, generating a vector representation of the risk observation text field for the one or more of the plurality of risk observations, and calculating pairwise similarity between the one or more of the plurality of risk observations based on the vector representations of the risk observation text fields of the one or more of the plurality of risk observations.

A system disclosed herein includes a memory, one or more processing units, and a service risk discovery system stored in the memory and executable by the one or more processor units, the service risk discovery system encoding computer-executable instructions on the memory for executing on the one or more processor units a computer process, the computer process including joining a plurality of risk objects of one or more of a group of cloud based services based on a service identification field of the plurality of risk objects to generate a service group risk vector, the service group risk vector including a plurality of risk observations for the group of cloud based services, combining, for one or more of the plurality of risk observations, a plurality of data fields of the risk observations to generate a risk observation text field for the one or more of the plurality of risk observations, generating a vector representation of the risk observation text field for the one or more of the plurality of risk observations, calculating pairwise similarity between the one or more of the plurality of risk observations based on the vector representations of the risk observation text fields of the one or more of the plurality of risk observations, and ranking one or more of the plurality of risk observations based on the pairwise similarity of the one or more of the plurality of risk observations with other risk observations.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:
    determining a group of cloud based services records sharing a service group hierarchy;
    generating a service group risk vector including risk observations for the group of cloud based services records by joining risk objects of one or more of the group of cloud based services records using join keys including a service identification field of the risk objects and an object identification field of the group of cloud based services records, the join keys identifying a common service entity within the service group hierarchy;
    combining, for one or more of the risk observations, data fields of the one or more of the risk observations to generate a risk observation text field for each of the one or more of the risk observations;
    generating a vector representation of the risk observation text field for each of the one or more of the risk observations; and
    calculating pairwise similarity between the one or more of the risk observations based on the vector representations of the risk observation text field of each of the one or more of the risk observations.

2. The method of claim 1, wherein generating the vector representation of the risk observation text field further comprising generating the vector representation by embedding words from the one or more of the risk observations into lower dimensional vector space.

3. The method of claim 1, further comprising ranking one or more of the risk observations based on the pairwise similarity of the one or more of the risk observations with other risk observations.

4. The method of claim 3, further comprising, for each risk observation of the risk observations, selecting a predetermined number of the other of the risk observations with highest pairwise similarity with the risk observation to generate a selected list of risk observations.

5. The method of claim 4, further comprising, for a cloud-based service sharing the service group hierarchy, ranking each of the risk observations based on a number of times the risk observations appear in the selected list of risk observations of the other risk observations for the cloud-based service sharing the service group hierarchy.

6. The method of claim 5, further comprising recommending, for the cloud-based service sharing the service group hierarchy, a predetermined number of top risk observations based on the ranking of the one or more of the risk observations.

7. The method of claim 1, further comprising removing noise from the risk observation text field from the risk observations to generate risk text document data for each of the risk observations.

8. The method of claim 7, wherein removing the noise from the risk observation text field from each of the risk observations comprises performing term frequency-inverse document frequency (TF-IDF) transformation on the risk observations.

9. One or more physically manufactured computer-readable storage media, encoding computer-executable instructions for executing on a computer system a computer process, the computer process comprising:
    determining a group of cloud based services records sharing a service group hierarchy;
    generating a service group risk vector including risk observations for the group of cloud based services records by joining risk objects of one or more of the group of cloud based services records using join keys including a service identification field of the risk objects and an object identification field of the group of cloud based services records, the join keys identifying a common service entity within the service group hierarchy;
    combining, for one or more of the risk observations, data fields of the one or more of the risk observations to generate a risk observation text field for each of the one or more of the risk observations;
    generating a vector representation of the risk observation text field for each of the one or more of the risk observations;
    calculating pairwise similarity between the one or more of the risk observations based on the vector representations of the risk observation text field of each of the one or more of the risk observations; and
    ranking one or more of the risk observations based on the pairwise similarity of the one or more of the risk observations with other risk observations.

10. The one or more physically manufactured computer-readable storage media of claim 9, wherein generating the vector representation of the risk observation text field further comprises generating the vector representation by embedding words from the one or more of the risk observations into lower dimensional vector space.

11. The one or more physically manufactured computer-readable storage media of claim 9, wherein the computer process further comprising for each risk observation d of the risk observations, selecting a predetermined number of the other of the risk observations with highest pairwise similarity with the risk observation to generate a selected list of risk observations.

12. The one or more physically manufactured computer-readable storage media of claim 11, wherein the computer process further comprising, for a cloud-based service sharing the service group hierarchy, ranking each of the risk observations based on a number of times the risk observations appear in the selected list of risk observations of the other risk observations for the cloud-based service sharing the service group hierarchy.

13. The one or more physically manufactured computer-readable storage media of claim 12, wherein the computer process further comprising recommending, for the cloud-based service sharing the service group hierarchy, a predetermined number of top risk observations based on the ranking of the one or more of the risk observations.

14. The one or more physically manufactured computer-readable storage media of claim 13, wherein the computer process further comprising removing noise from the risk observation text field from the risk observations to generate risk text document data for each of the risk observations.

15. The one or more physically manufactured computer-readable storage media of claim 14, wherein removing the noise from the risk observation text field from each of the risk observations comprises performing term frequency-inverse document frequency (TF-IDF) transformation on the risk observations.

16. A system comprising:
a memory;
one or more processor units; and
a service risk discovery system stored in the memory and executable by the one or more processor units, the service risk discovery system encoding computer-executable instructions on the memory for executing on the one or more processor units a computer process, the computer process comprising:
generating a service group risk vector including risk observations for a group of cloud based services records sharing a service group hierarchy by joining risk objects of one or more of the group of cloud based services records using join keys including a service identification field of the risk objects and an object identification field of the group of cloud based services records, the join keys identifying a common service entity within the service group hierarchy;
combining, for one or more of the risk observations, data fields of the one or more of the risk observations to generate a risk observation text field for each of the one or more of the risk observations;
generating a vector representation of the risk observation text field for each of the one or more of the risk observations;
calculating pairwise similarity between the one or more of the risk observations based on the vector representation of the risk observation text field of each of the one or more of the risk observations; and
ranking one or more of the risk observations based on the pairwise similarity of the one or more of the risk observations with other risk observations.

17. The system of claim 16, wherein the computer instructions further comprising for each risk observation of the risk observations, selecting a predetermined number of the other of the risk observations with highest pairwise similarity with the risk observation to generate a selected list of risk observations.

18. The system of claim 17, wherein the computer instructions further comprising, for a cloud-based service sharing a service group hierarchy, ranking each of the risk observations based on a number of times the risk observations appear in the selected list of risk observations of the other risk observations for the cloud-based service sharing the service group hierarchy.

19. The system of claim 18, wherein the computer instructions further comprising, for the cloud-based service sharing the service group hierarchy, a predetermined number of top risk observations based on the ranking of the one or more of the risk observations.

20. The system of claim 17, wherein the computer instructions further comprising removing noise from the risk observation text field from each of the risk observations by performing term frequency-inverse document frequency (TF-IDF) transformation on the risk observations.

* * * * *